Dec. 9, 1952 Y. DE MUNCK 2,621,221

TROUGH FOR BATTERY ACCUMULATORS

Filed July 11, 1950

INVENTOR:
Yves De Munck.
By

Patented Dec. 9, 1952

2,621,221

UNITED STATES PATENT OFFICE 2,621,221

TROUGH FOR BATTERY ACCUMULATORS

Yves de Munck, Genval, Belgium

Application July 11, 1950, Serial No. 173,119
In Belgium August 23, 1949

2 Claims. (Cl. 136—166)

The surfaces of the container of battery accumulators are often moist as a result of the porosity of the material used, the condensation, the electrolyte spilling or for any other reasons.

Because of this fact, there may occur current loses to the ground and the material or parts lodged beneath the battery may be corroded or destroyed.

Furthermore, the plates forming the elements of the accumulators are very frail; the spongy lead and lead peroxide that fill the framework of the grids may, due to vibration, fall down to the bottom of the container, causing thus the slow destruction of the battery which may be hastened by the shocks transmitted from the vehicle to the battery.

The present invention palliates these inconveniences, mentioned among others, and allows to collect any liquid running down along the walls of the battery and permits also the absorption of the shocks which may be transmitted from the vehicle.

The present invention relates to a trough, the size of which being established in view to be adapted to or to receive the bottom of the container of the battery accumulators. At the same time, the invention aims to prevent the undue increasing of the incumbrance of the battery thus equipped.

The trough is generally made of a resilient, insulated and water-tight material, amalgamated or not and having side walls perpendicular to the bottom.

Vertical grooves of little depth are provided on the entire inner face of the side walls of the trough and the upper edge of said walls are moulded into sloping, reversed fluting, quarter-round edges, a bossage on the edges or edges of any suitable form having a lower point directed to the inside of the trough so as to form a gutter facilitating the inlet of the liquid that may run down the walls of the battery into the vertical grooves of the trough. The upper edge of the side walls of the trough when provided with a bossage forming or not a gutter prevents also the deformation of said upper edge when the trough is to be fitted tight to the bottom of a battery.

According to a different design, instead of using vertical grooves, the side walls of the trough may be provided with embossments, salients or ribs which open beneath the extreme edge of the side walls of the trough with the result that the upper ridge of the walls of the trough is maintained at a distance from the container of the battery, thus allowing the liquid running down along the sides of the battery, to be collected in the trough; these embossments, salients or ribs form a hollow which allows the free passage of the liquid to the empty spaces subsisting around and between the embossments of the bottom of the trough.

These embossments may be formed by a goffering of any suitable kind or may be formed of any suitable design or embossed inscription including all or part of the bottom surface of the trough. In addition of the mentioned purpose, it serves also to absorb the shocks, jerks and vibrations which may cause the destruction of the plates or the battery container. An opening, extended by an outlet which may be connected to a rubber tube, may be provided at a suitable place in the bottom of the trough, allowing thus the eventual outflow of the liquid collected in the trough. It is rather rare, at least without accident, that the quantity of liquid collected in the trough cannot be held in all the empty spaces of said trough.

The above described discharge also assures a better ventilation inside the trough.

The invention will be fully understood from the accompanying drawings, showing by way of example one of the forms of application thereof.

Figure 1:
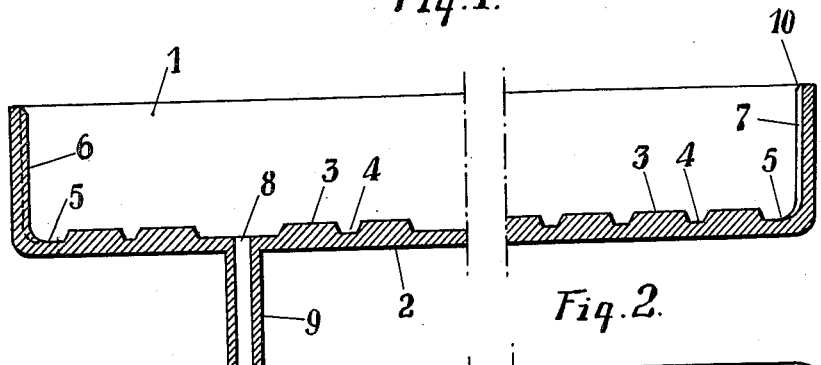
Fig. 1 shows a partial section of the elevation of a trough.
Figure 2:
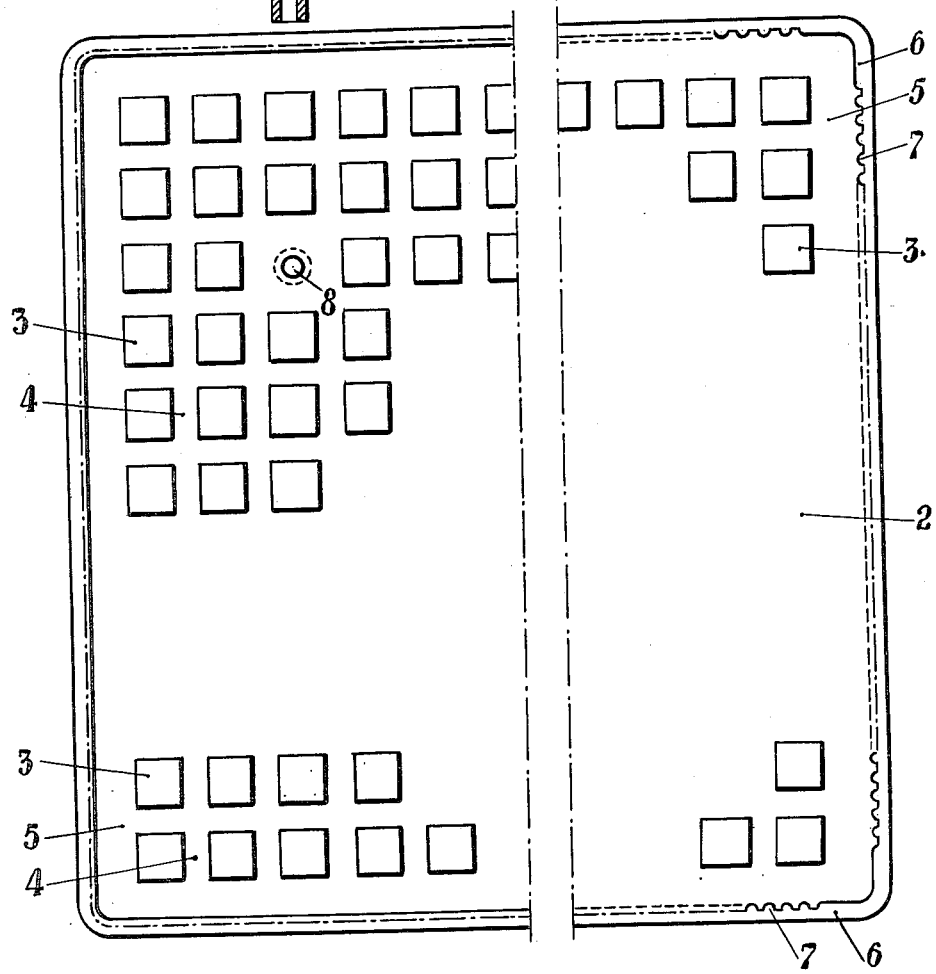
Fig. 2 shows a plan view thereof.

The trough 1 is of rubber and comprises a bottom 2 provided with a goffering 3 forming the drain 4 each one of them opening into the drain 5 extending on the entire inner face of the trough at the foot of the vertical walls 6 of this latter. The inner face of the walls 6 is provided with little vertical grooves 7 which, at their upper part, extend from the upper edge 10 of said walls, the said upper edge being moulded into sloping edges and forming a gutter; the lower part of said grooves opens into the drain 5. An opening 8 extended by an outlet 9 and forming a discharge for the outflow of the liquid collected in the trough and serving also for the better ventilation of this latter is provided in the bottom 2 of said trough. A rubber tube, not shown on the drawings, may be eventually connected to the outlet 9.

What I claim is:

1. A tray for a storage battery consisting of a resilient impermeable material, comprising in combination, a bottom wall and four side ledges, said side ledges being formed with a plurality of projections adapted to support the lower edge portions of the side walls and the bottom wall of the storage battery and forming between each other a plurality of depressed portions for ventilating the outer surface of the storage battery and for collecting liquid from the walls of the storage battery the upper edges of said side ledges being inwardly and downwardly inclined for guiding liquid towards said depressed portions.

2. A tray for a storage battery consisting of a resilient impermeable material, comprising in combination, a bottom wall and four side ledges, said side ledges being formed with a plurality of parallel projections extending normal to said bottom wall adapted to laterally support the lower edge portions of the side walls of the storage battery and forming between each other a plurality of depressed portions for collecting liquid from the walls of the storage battery the upper edges of said side ledges being inwardly and downwardly inclined for guiding liquid towards said depressed portions, and said bottom wall being formed with a plurality of projections adapted to support the bottom wall of the storage battery and forming between each other a plurality of depressed portions for collecting liquid from the side walls of the storage battery for evaporation and for preventing losses due to surface leakage currents.

YVES DE MUNCK.

REFERENCES CITED

The following references are of record in the file of this patent:

UNITED STATES PATENTS

| Number | Name | Date |
|---|---|---|
| 673,678 | Chamberlain et al. | May 7, 1901 |
| 704,750 | Lesley | July 15, 1902 |
| 729,550 | Condict | June 2, 1903 |
| 930,728 | Chamberlain et al. | Aug. 10, 1909 |
| 1,290,487 | Melia | Jan. 7, 1919 |
| 1,304,588 | Monohan | May 27, 1919 |
| 1,305,084 | Flanders | May 27, 1919 |
| 1,510,184 | Manning | Sept. 30, 1924 |

FOREIGN PATENTS

| Number | Country | Date |
|---|---|---|
| 3,710 | Great Britain | Mar. 8, 1915 |